United States Patent

[11] 3,592,222

| [72] | Inventors | John B. Goss;<br>John E. Stachowiak, both of Harris County, Tex. |
|---|---|---|
| [21] | Appl. No. | 881,828 |
| [22] | Filed | Dec. 3, 1969 |
| [45] | Patented | July 13, 1971 |
| [73] | Assignee | American Aero Industries, Inc. |

[54] RELIEF VALVE
10 Claims, 3 Drawing Figs.

[52] U.S. Cl. .................................................. 137/467,
137/488, 137/492, 137/494
[51] Int. Cl. .................................................. F16k 17/00
[50] Field of Search .................................................. 137/467,
488, 489, 492, 494

[56] References Cited
UNITED STATES PATENTS
| 2,902,046 | 9/1959 | Pollison ........................ | 137/467 |
| 3,409,037 | 11/1968 | Nelson ........................ | 137/467 X |

*Primary Examiner*—Harold W. Weakley
*Attorney*—Pravel, Wilson & Matthews

ABSTRACT: A relief valve for releasing surges of liquid at a predetermined relief pressure in fluid-pumping systems comprising a valve held in closed position in its housing by a latch means which permits the valve to move without opening to accommodate pressure variations in the system and which opens at a predetermined pressure to release pressure from the system. The invention also includes means to vary the predetermined pressure at which such valve opens and also means to manually reset the valve after discharge to release again at such predetermined relief pressure without further adjustment.

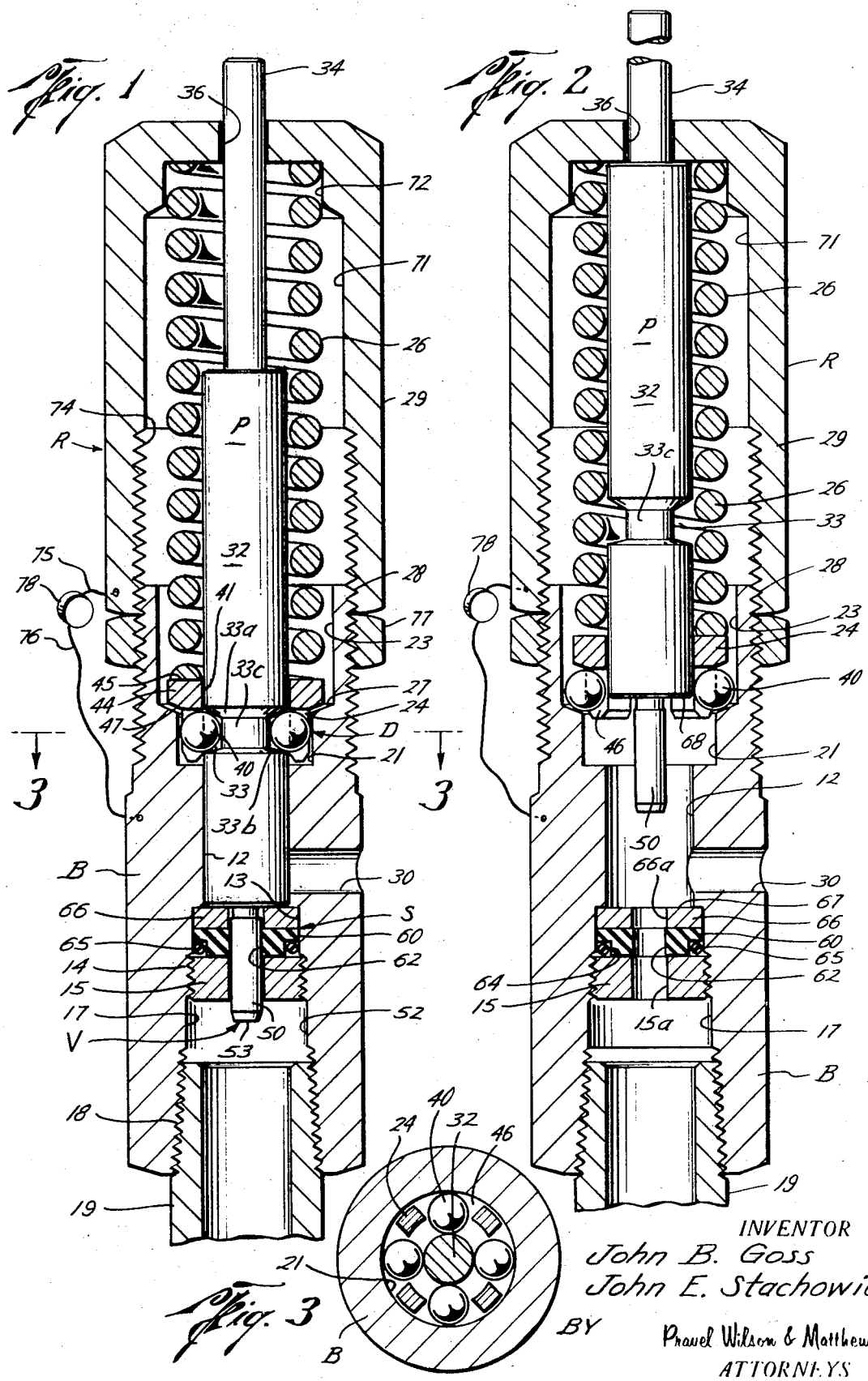

RELIEF VALVE

BACKGROUND OF THE INVENTION

1. Field of the Invention

The invention pertains to a relief valve and more particularly to a fluid relief valve having adjustable means for varying the pressure at which the valve opens and means for automatically resetting the valve after discharge so as to reopen when such predetermined relief pressure is again reached.

2. Description of the Prior Art

The prior art safety or relief valves used with Also, many liquid handling systems, e.g. 10,000 p.s.i., tend to develop leaks in use. What begins as a very small trickle ultimately erodes or cuts the valve surface and thus the leak grows until it is necessary to repair or replace the worn valve. Attempts to overcome this problem have included use of tungsten carbide valve tips; however, they also were found to develop leaks in much the same fashion. Valves of this type generally require periodic disassembly and regrinding of the sealing parts in order to remove the erosion and provide a tight seal in the valve. Also, many safety valves require readjustment each time they pop off or release in order to maintain the desired relief pressure setting in such valves.

Also, in one prior art valve known to applicants, a locking pin is used which is designed to shear at a selected pressure to allow the valve to open; however, workmen sometimes substitute shear pins, nails or similar OF of much harder metal than the shear pin required for releasing at the selected pressure, and thus the whole purpose of such safety relief valve is nullified.

SUMMARY OF THE INVENTION

The present invention provides a new and improved safety relief valve having a longitudinally extending valve rod received in a surrounding seal with releasable means for releasably holding such rod in the seal while allowing it to move in response to limited liquid surges but releasing said rod from the seal when the liquid pressure reaches a predetermined amount.

It is also an object of the present invention to provide a new and improved safety relief valve adapted to open in response to pressure surges in a liquid-pumping operation wherein the relief valve comprises a sliding rod seated in a surrounding seal with an internal latch means for holding the valve in a closed position relative to its seat until a predetermined pressure on the rod moves the latch means to a release position whereby the valve is allowed to snap open and release the pressure thereon. Because the internal latch means is located internally, workmen cannot readily substitute parts which might nullify its release at the predetermined pressure.

It is a further object of the present invention to provide a new and improved pressure release valve which may be adjusted to open at a predetermined pressure and which, after opening at such pressure, is adapted to manually closed and reset to thereafter snap open when such predetermined pressure is again reached without further adjustment of the pressure determining means.

BRIEF DESCRIPTION OF THE DRAWINGS

FIG. 1 is a side view partly in elevation and partly in section showing the safety relief valve of the present invention in a closed position, FIG. 2 is a side view partly in elevation and partly in section showing the safety relief valve of the present invention in an open position; and FIG. 3 is a transverse sectional view taken on line 3-3 of FIG. 1 showing the means for holding the valve in a closed position.

DESCRIPTION OF THE PREFERRED EMBODIMENTS

The safety relief valve of the present invention is designated generally R in FIG. 1 of the drawings. Such relief valve R comprises a main housing or body B, in which there is received a sliding plunger P on which is carried a valve element V which seats in a sealing means designated generally S. A detent or latch means designated generally D holds the valve element V in the closed position in the sealing means S until a predetermined liquid pressure acting on the valve element forces the plunger P upwardly to release the latch means D and allow such valve element V to snap open and release the pressure thereon.

Considering now the apparatus of the present invention in more detail, the valve housing or body B is provided with a central bore 12 for slidably receiving the cylindrical plunger P. A lower counterbore 13 of larger diameter than the central bore 12 is formed adjacent to the central bore for receiving the seal means S which will be described in detail hereinafter. The bore 12 and counterbore 13 are referred to herein as a pressure chamber.

Threads 14 are formed in the lower portion of the counterbore 13 for receiving a threaded disc 15 which secures the sealing mechanism S in such counterbore 13 and also provides a guide for the valve element V. A second lower counterbore 17 is provided below and adjacent the counterbore 13 and is provided with threads 18 for receiving a threaded nipple or connection 19 that forms the inlet to the relief valve R from a pressure source (not shown) such as a liquid holding tank or the like in which liquid under pressure is contained.

A first upper counterbore 21 is formed in the housing B above the central bore 12 for receiving the detent or latch means D which will be described in detail hereinafter.

A larger counterbore 23 is formed in the housing B above the counterbore 21 for receiving a circular detent housing or ball retainer 24 and the lower end of a spring 26. An upwardly and outwardly inclined annular shoulder 27 connects the small counterbore 21 and the larger diameter counterbore 23 for providing an inclined plane to assist in releasing the balls or detents 40 as will be described in detail hereinafter.

Such housing or body B is also provided with external threads 28 at its upper end for connecting a plunger cap 29 to such housing B and for adjusting the compression of the spring 26 which is received in the counterbore 23 as will be described hereinafter. Such housing B also includes a lateral discharge port 30 which communicates the central bore 12 with the exterior of the body B for discharging liquid introduced into the central bore 12 through the inlet 19 when the valve means V is opened.

The plunger P comprises a longitudinally extending cylindrical body 32 having an upper guide rod 34 which extends upwardly from the cylindrical body 32 and projects through a central opening 36 in the top of the plunger cap 29 for manually resetting the balls or detents 40 after the valve V has been opened, as will be described in detail hereinafter.

A circumferentially extending tapered recess or groove 33 is formed in the cylindrical body 32 for receiving the detents 40. Such groove 33 preferably has inclined sides 33a and 33b and a cylindrical base 33c.

In the preferred form of the present invention the detent means D comprises a plurality of the circumferentially spaced balls 40 which are carried in the circular housing 24 surrounding the cylinder 32 and are adapted to move into and out of the recess 33 to secure or release the valve V as will be described in detail hereinafter. Such circular housing 24 includes a central opening 41 for receiving the cylindrical plunger body 34. The circular ball retainer 24 also includes a laterally projecting annular flange 44 having an upper annular shoulder 45 formed on the upper side of the annular flange 44 for receiving the lower end of the coil spring 26 that urges the plunger P downwardly when the balls 40 are in position in the groove or recess 33. The body 24 has a lower inwardly and downwardly inclined annular shoulder 47 formed thereon to facilitate the outward movement of the detent balls 40 into the counterbore 23. It should be noted that the balls 40 are disposed offcenter, that is, their centers are outwardly of the outer edge of the recess 33, so that when the fluid pressure acts upwardly on the valve V, the balls 40 are squeezed outwardly between the surface 33b and the action of the spring 26 on the ring 44. Therefore, when the balls 40 are moved upwardly above the upper end of the counterbore 21, they are squeezed outwardly into the bore 23.

As best seen in FIG. 3 of the drawings, it is preferable to provide the lower portion of the circular body 24 with a plurality of circumferentially spaced slots or holes 46 for retaining the balls 40 therewith, but permitting the radial movement of the balls 40. The balls 40 are of a spherical configuration and are of such diameter that when they are positioned in the groove or recess 33 the center of each ball 40 is positioned radially beyond the outer surface of the cylindrical body 32 as explained above. Thus, the balls are positioned offcenter so that when the plunger P is moved upwardly into the position shown in FIG. 2 of the drawings, the balls 40 will move radially outwardly from their positions in the groove 33 into the larger diameter counterbore 23 (FIG. 2) to thereby permit the lower portion of the plunger P to move upwardly relative to the balls 40 and without resistance from the spring 26. In order to connect the plunger 32 with the spring 26, it is necessary to insert the balls 40 into the groove 33. The inwardly and downwardly inclined annular shoulder 27 urges the balls 40 radially inwardly when the groove 33 is aligned therewith. Also, as shown in FIG. 2, the difference between the diameter of the large diameter counterbore 23 and the smaller diameter counterbore 21 is less than the radius of the balls 40. Then when the balls 40 are in the counterbore 23, they are in an offcenter position on the inclined shoulder 27 at the bottom of the counterbore 23, and are squeezed inwardly into the groove 33 between the pressure of the spring 26 on the ring 44 and the inclined annular shoulder 27 when the plunger 32 is moved downwardly to align the groove 33 with the balls 40.

The valve V comprises a longitudinally extending polished rod or shaft 50 of stainless steel or other suitable material that is axially disposed relative to the cylindrical plunger body 34 and depends downwardly from the lower end thereof. Such valve rod 50 preferably has a polished external surface for maintaining a seal with the sealing element 60 and a tapered portion 52 adjacent the lower end 53 to facilitate insertion into the sealing element 60.

In the preferred form of this invention, the sealing element 60 is formed of a suitable sealing material such as a polymide resin product sold under the trademark "Vespel" or other suitable material. As shown, such sealing element 60 is a circular disc having a central opening 62 therein for receiving a valve rod 50 and forming a seal therewith whether such rod is in a stationary position in the opening 62 or is being moved longitudinally in such opening. The disc sealing element 60 is provided with an outer annular groove 64 adjacent its lower edge for receiving an O-ring seal 65 of rubber of the like which provides a seal between the outer edge of the disc 60 and the adjacent wall of the counterbore 13. The compression of O-ring under pressure also creates an inwardly biased force on the sealing element 60 that compresses the sealing element 60 radially inwardly and provides a higher sealing effect on rod valve 50 with increasing pressure.

An upper support disc 66 of metal or the like having a central opening 66a therein aligned with the opening 62 is provided in the counterbore 13 above the sealing element 60 and provides a laterally extending annular shoulder 67 for receiving the annular shoulder 68 surrounding the rod valve 50 on the lower end of the cylindrical body 32. The lower support disc 15 is threaded into the counterbore 12 for securing the sealing element 60 in place therein. Such lower support disc 15 is provided with a central opening 15a aligned beneath the openings 62 and 66a for receiving the rod valve 50.

The plunger cap 29 preferably comprises a cylindrical body having a main bore 71 therein with a counterbore 72 at the upper end thereof for receiving upper end of the spring 26. Threads 74 are provided in the bore 71 for connecting the plunger cap 29 to the threads 28 on the housing B. It will be appreciated that with the valve rod 50 in the closed position with the lower annular shoulder 68 of the cylinder body 32 engaging the upper annular shoulder 67 on the support disc 66, compression of the spring 26 will be decreased or increased by loosening or tightening the plunger cap 29 on the housing B.

Thus, the desired pressure at which the relief valve V will snap to a fully open position can be determined or set by rotating the plunger cap 20 to adjust the compression on the spring 26. When the predetermined pressure has been set, a locknut 77 carried on the threaded portion 28 of the housing B is tightened adjacent the lower end of the cap 29 to thereafter prevent the cap 29 from being tightened to compress the spring 26 beyond the desired amount to thereby prevent unauthorized personnel from increasing the maximum relief pressure at which the valve V opens.

Preferably, a safety seal wire 75 connected to the cap 29 is joined to a safety seal wire 76 with the body B by a lead seal 78 so that rotation of the cap 29 relative to such housing B cannot be accomplished without breaking the seal 78. Therefore, if unauthorized personnel inadvertently or intentionally loosen the cap 29 to change the compression of the spring 26, such change can be readily detected, and corrected if necessary.

In using the relief valve mechanism of the present invention, the housing or body B is connected to a pressurized liquid tank (not shown) by means of a nipple or connecting pipe 19. The valve V is closed by manually depressing the valve rod 34 which projects upwardly through the opening 36 in the top of the valve cap 29. When such plunger rod is depressed, it moves the plunger P downwardly to align the groove or circumferentially extending recess 33 with the balls 40. When the balls 40 are out of the recess 33 (FIG. 2), because of the inclined shoulder 27, the spring 26 exerts a force in a direction urging the balls 40 inwardly so that when the recess 33 is aligned with the balls 40, they are forced into the recess 33. Thereafter, as the plunger P is moved downwardly, the balls 40 move downwardly therewith until they reach the counterbore 21. At this point, the valve rod 50 is in the closed sealing position with such valve rod 50 extending through the central opening 62 in the sealing element 60.

The spring 26 resiliently holds the circular housing or ball retainer 24 at the bottom of the counterbore 23 with the balls 40 in the smaller diameter counterbore 21. The valve rod 50 is held in such closed sealing position even though liquid pressure acting on the lower end 53 of the valve rod 50 may reach a sufficient magnitude to compress the spring 26 to some extent and move the plunger P upwardly to some extent so long as the detent balls 40 remain in the counterbore 21. When a surge of pressure is sufficient to lift the plunger P upwardly high enough to align the balls 40 with the counterbore 23, they are forced radially outwardly into the counterbore 23 by reason of the offcenter position of the balls 40 and the squeezing action of the ring 44 and the upwardly moving surface 33b to thus move out of the groove 33, which results in a release of the plunger body 34 from the spring 26. When such detent balls 40 are thus moved out of the groove 33, and the action of the spring 26 is disconnected from the plunger P, pressure acting on the lower end 53 of valve rod 50 rapidly moves or snaps the valve V upwardly out of the seal 60 as shown in FIG. 2 of the drawings, thus opening the passage 62 through the disc 60 to permit discharge or flow from the inlet 19 through the side port 30 of the housing B.

From the foregoing description, it should be appreciated that the longitudinally extending valve rod 50 can move upwardly or downwardly a predetermined distance, approximately the height of the counterbore 21, in the sealing element 60 in response to limited surges or variations in the liquid pressure without fully opening the relief valve 50. During such fluctuations, which are below the predetermined pressure for snapping the valve V fully open, the seal between the sealing element 60 and the longitudinally extending valve 50 is maintained although the valve rod 50 is sliding or moving longitudinally relative to such sealing element 60, and therefore, erosion or cutting of the rod 50 and the seal 60 by trickling liquid passing therebetween under pressure is prevented.

When a surge of pressure is sufficient to lift the valve V and align the balls 40 with the inclined annular shoulder 27, due to the offcenter position of the balls 40 and the squeezing action on the balls 40, the balls are urged radially outwardly and up the inclined surface 27 into the larger diameter counterbore 23 and out of the groove 33 to release the plunger P for snapping movement longitudinally upwardly to the top of the plunger cap 29. The plunger will be released with a quick snap-action when the balls 40 have moved to the inclined annular shoulder 27.

As shown in FIG. 2, when the plunger P has moved to its uppermost position, there is no force acting on it to return it downwardly. The balls 40 are held in position adjacent the lower end of the cylinder 34 in their respective slots 46 in the circular housing 24 so that when it is desired to reset the valve V, the plunger P is moved manually downwardly to again align the balls 40 with recess 33 and then seat the valve V in the closed position (FIG. 1) as explained above.

As previously explained, the groove 33 is aligned laterally adjacent the balls 40, the inclined lower surface 47 on the annular shoulder 44 will engage the balls and cause them to move downwardly on the inclined surface 27 into the groove 33 to thus permit the balls 40 to be moved downwardly into the smaller counterbore 21 (FIG. 1). Thus, after the relief valve R has been opened in response to a pressure surge on the valve V, such valve must be reset manually by moving the upper valve rod 34 downwardly so as to seat the valve V in the opening 62 and to position the detent balls 40 in the counterbore 21.

The foregoing disclosure and description of the invention are illustrative and explanatory thereof, and various changes in the size, shape, and materials as well as in the details of the illustrated construction may be made without departing from the spirit of the invention.

We claim:
1. An internal locking safety relief valve for releasing predetermined surges of liquid pressure, comprising:
   a. a housing;
   b. said housing having a pressure chamber and inlet means connected with the pressure chamber;
   c. said housing also having discharge means in communication with said pressure chamber for discharging liquid from said pressure chamber;
   d. valve means movable longitudinally in said pressure chamber;
   e. seal means in said pressure chamber surrounding said valve means for maintaining sealing engagement therewith during limited longitudinal movement of said valve means relative to said seal means due to pressure surges in the pressure chamber below a predetermined pressure; and
   f. releasable latch means with said valve means for releasably holding said valve means in a closed position in said sealing means at pressures below the predetermined release pressure.

2. The invention of claim 1 wherein said release latch means includes spring means for urging said valve means into a closed position relative to said seal means.

3. The invention of claim 1 wherein said valve means comprises a longitudinally extending valve rod having a polished external surface.

4. The invention of claim 3 wherein said seal means comprises a disc of sealing material having an opening therethrough for receiving said valve rod.

5. The invention of claim 4 including an annular groove in the outer edge of said sealing disc having an O-ring seal therein for sealing between the outer edge of the disc and the adjacent wall of the housing.

6. The invention of claim 2 including a plunger disposed in said housing and having said valve means mounted thereon.

7. The invention of claim 6 wherein said releasable latch means includes a plurality of circumferentially spaced balls which are radially movable into a groove in said plunger for connecting said spring means to said plunger to urge said valve means toward a closed position in said seal means and which are radially movable out of said groove to release said plunger from said spring means.

8. The invention of claim 7 including means with said plunger for manually moving said plunger longitudinally of said housing to move said radially movable elements into said groove to connect said spring means with said plunger to urge said valve means toward a closed position.

9. The invention of claim 7 wherein the center of each of said balls is disposed radially outwardly relative to said groove when lodged therein to cause said balls to move radially outwardly from said groove when squeezed against the side of said groove by said spring means.

10. The invention of claim 7 wherein said housing includes a small diameter counterbore and a large diameter counterbore connected by an inwardly and downwardly inclined annular shoulder and wherein said balls are positioned with their centers radially inwardly of said annular shoulder when in said large diameter counterbore to cause said balls to move radially inwardly into said groove when aligned therewith and squeezed against said annular shoulder by said spring means.

UNITED STATES PATENT OFFICE
CERTIFICATE OF CORRECTION

Patent No. 3,592,222     Dated July 13, 1971

Inventor(s) John B. Goss; John E. Stachowiak

It is certified that error appears in the above-identified patent and that said Letters Patent are hereby corrected as shown below:

In column 1, line 14:

After "with" delete "Also, many" and insert therefor --relatively high pressure--.

Signed and sealed this 11th day of July 1972.

(SEAL)
Attest:

EDWARD M. FLETCHER, JR.  
Attesting Officer

ROBERT GOTTSCHALK  
Commissioner of Patents